July 11, 1950
L. C. BLACK
2,514,467
SYNCHRONIZED STEERING AND THROTTLE CONTROL APPARATUS FOR OUTBOARD MOTORS
Filed Sept. 6, 1949
4 Sheets-Sheet 4
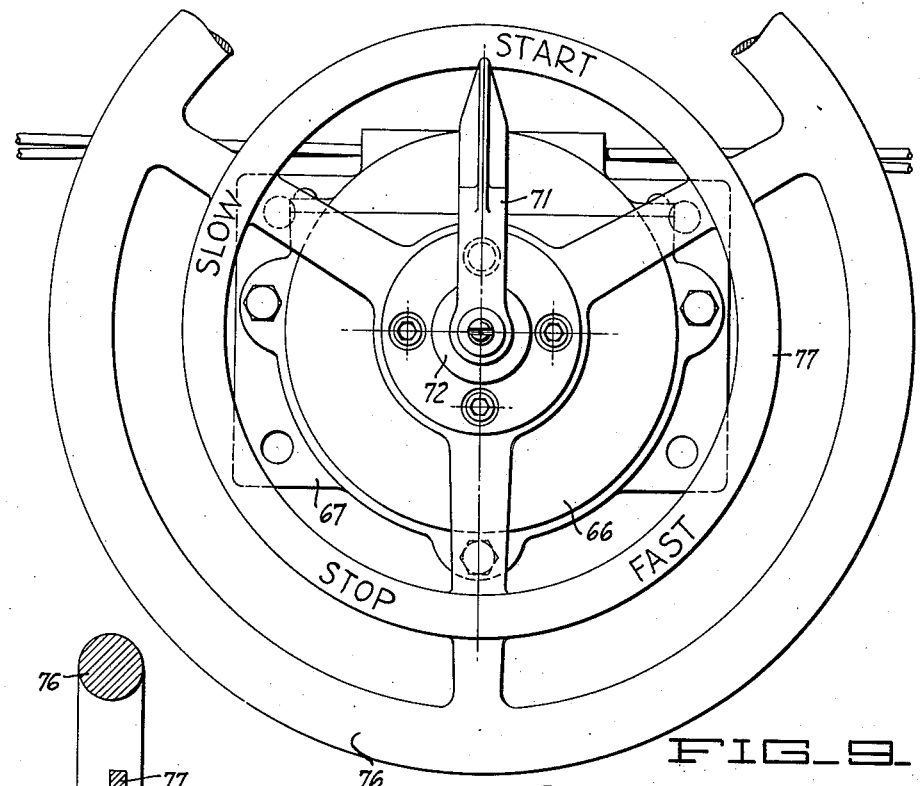
FIG_9_
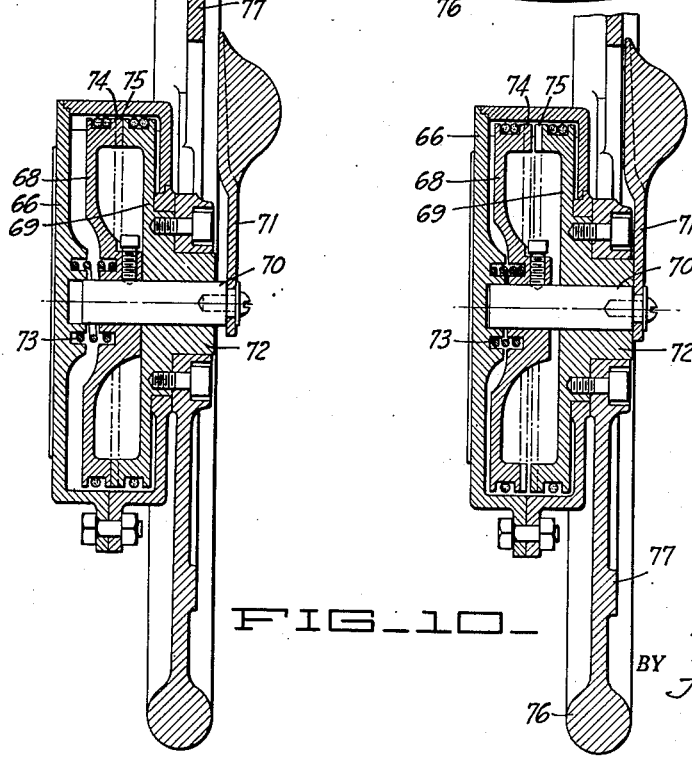
FIG_10_
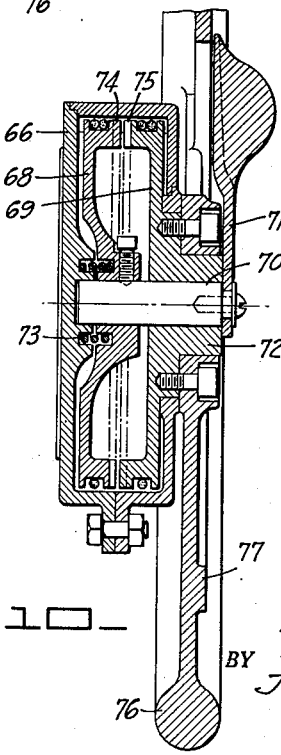
FIG_11_
INVENTOR.
Lester C. Black
BY
ATTORNEYS Patented July 11, 1950

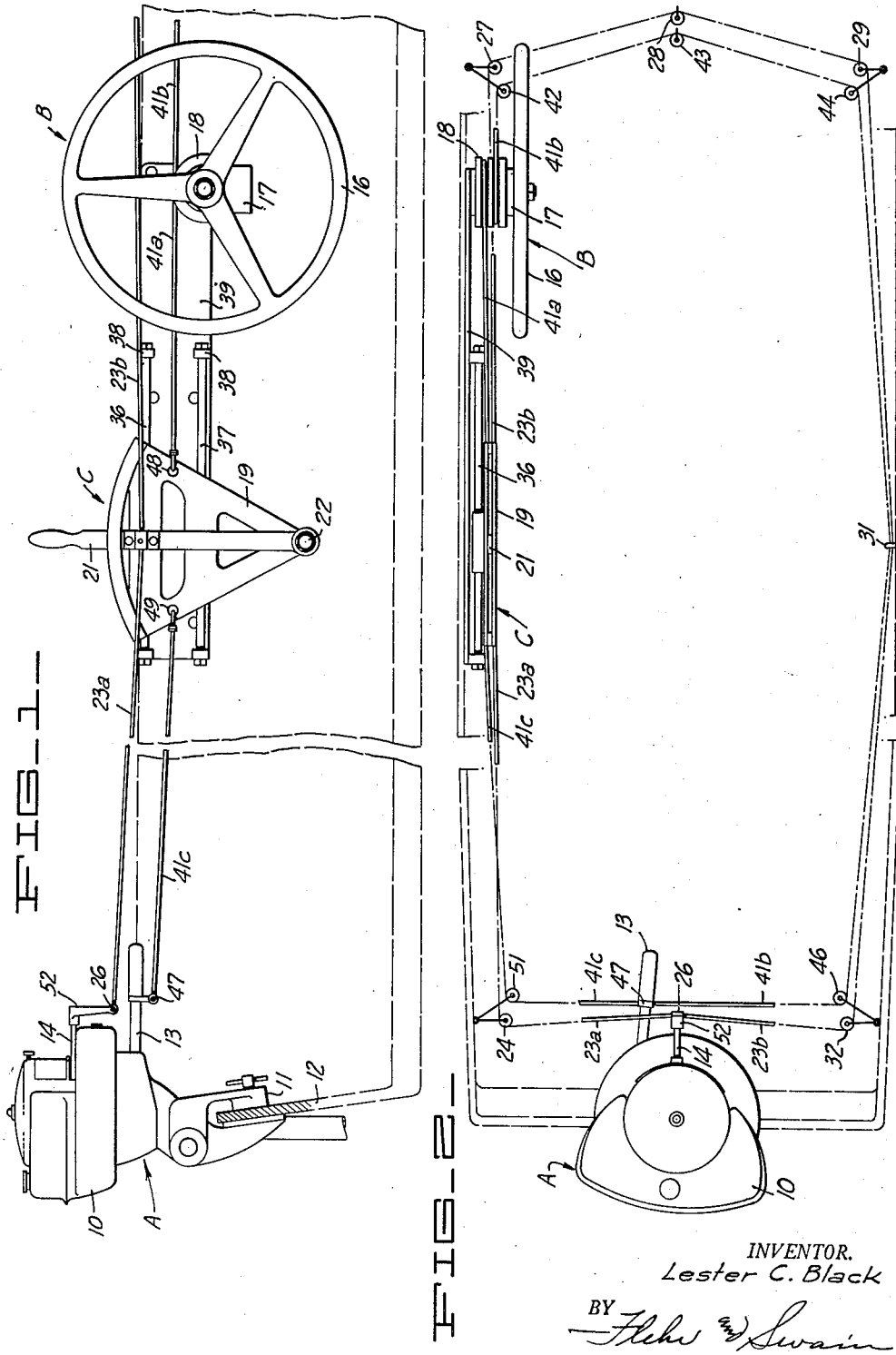

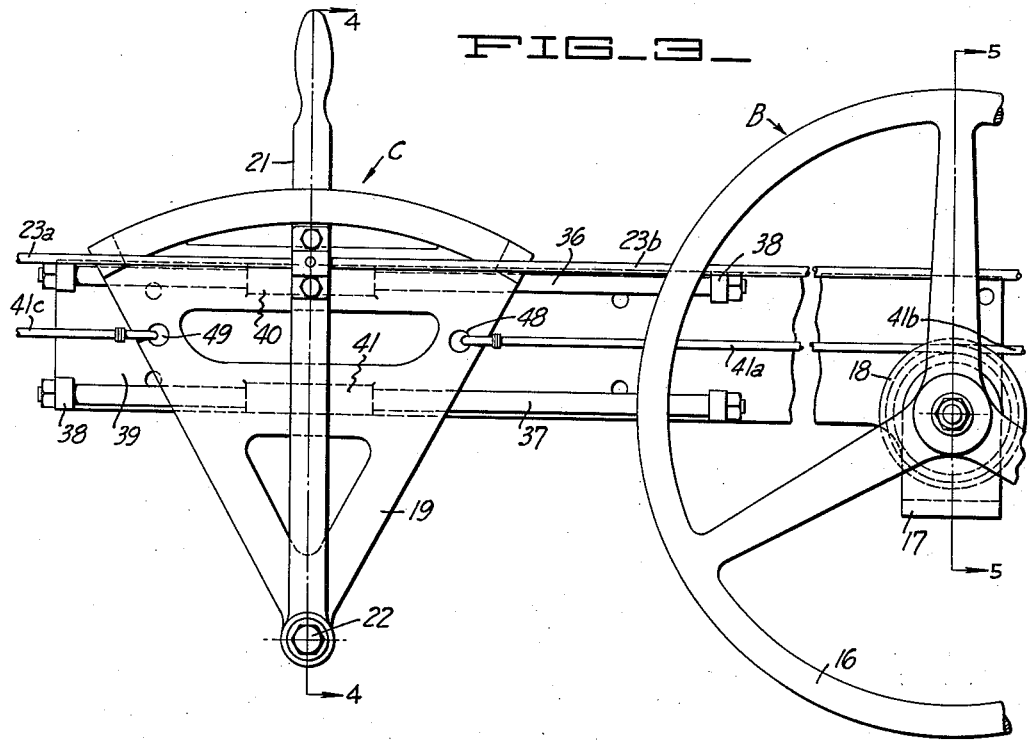
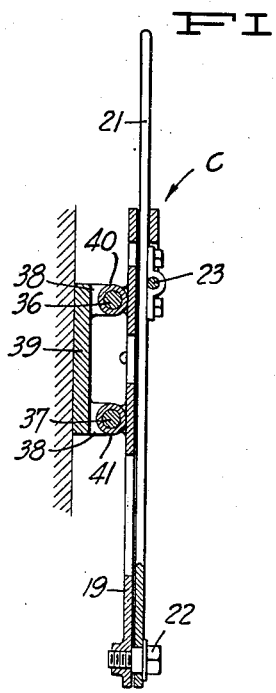
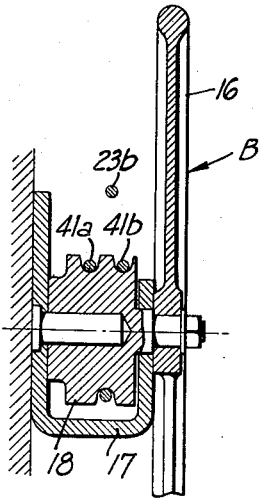

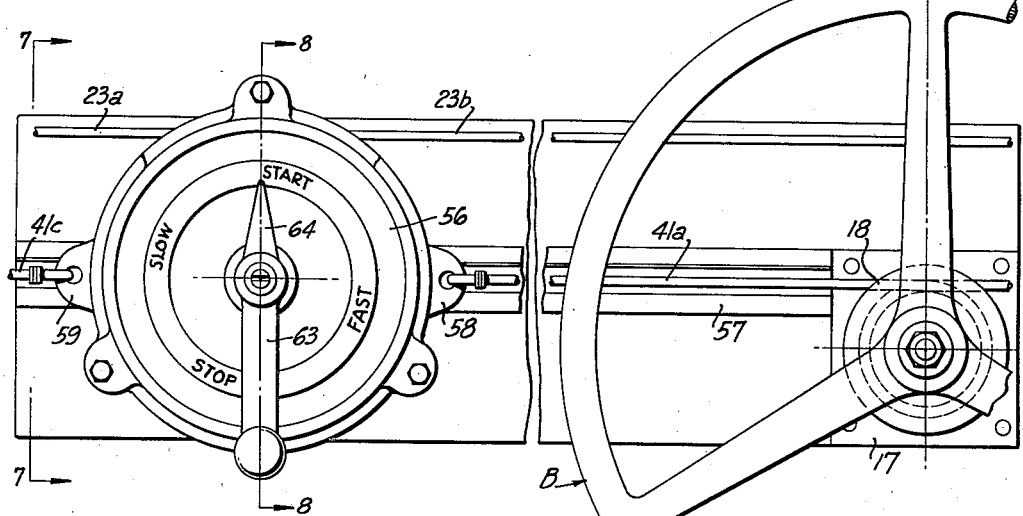
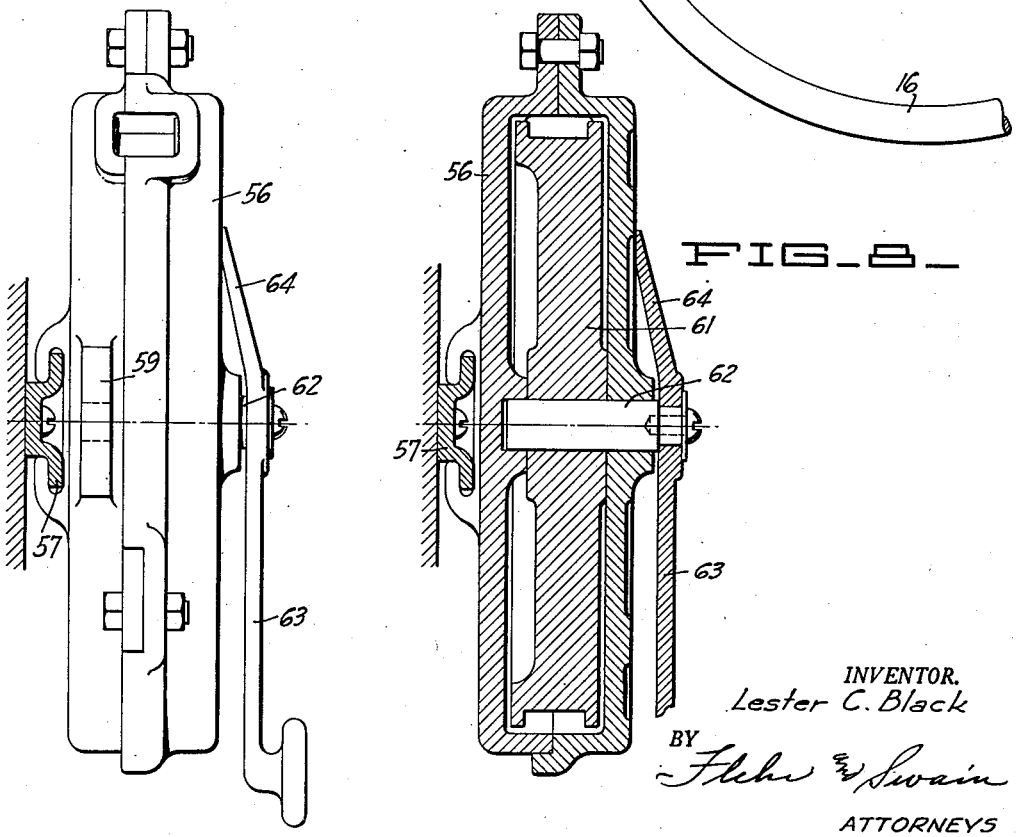

2,514,467

UNITED STATES PATENT OFFICE 2,514,467

SYNCHRONIZED STEERING AND THROTTLE CONTROL APPARATUS FOR OUTBOARD MOTORS

Lester C. Black, Long Beach, Calif.

Application September 6, 1949, Serial No. 114,252

7 Claims. (Cl. 115—18)

This invention relates generally to steering and throttle control apparatus suitable for use with outboard boat motors.

Conventional outboard boat motors make use of a motor-propeller assembly which is provided with clamping means for attachment to the transom of a boat. When in operating position the entire assembly can be swung about a generally vertical axis, corresponding to the axis of a pivotal connection between the clamping means and the motor-propeller assembly. The upper part of the assembly carries a forwardly extending steering or tiller arm, to facilitate steering operations, and in addition a throttle lever is provided for controlling the speed of the motor. The throttle lever is generally pivotally mounted upon the motor assembly, on an upright axis which is coincident to or not far displaced from the first-mentioned axis, and the lever extends forwardly to a convenient position to facilitate changing the throttle setting in conjunction with steering operations. When the tiller arm is swung from one position to another, the throttle lever swings in a similar manner, but remains stationary with respect to its associated mounting.

It is frequently desirable to connect such outboard motors to remote steering devices. Thus in one typical type of installation a steering wheel is provided forwardly of the boat, and has a spool or winch drum which is engaged by a rope or cable. The rope extends through pulleys or guides to the rear of the boat, where it is attached to the tiller arm. In conjunction with such remote steering it is desirable to provide means for remote throttle operation. This presents a serious problem because of movement of the throttle lever in conjunction with steering movements. One method of remote throttle operation has been to disable the standard throttle and operate the carburetor or mixer throttle directly by a Bowden wire or like means extending forwardly to the steering wheel. This method of speed control is unsatisfactory because it interferes with normal starting and operation of the motor, and in addition it involves an installation beyond the skill of the usual operator, and one which interferes with ready attachment or removal of the outboard motor from the boat. If one attempts to apply separate independent remote control to the regular throttle, in addition to the steering means, then the remote throttle control member necessarily moves in conjunction with changes in the steering position, and therefore its position cannot be used as an indication of the actual position of the throttle lever.

It is an object of the present invention to provide an improved apparatus for the remote control of outboard motors, and which in particular facilitates remote throttle operation.

Another object of the invention is to provide remote control apparatus of the above character which will make possible synchronized throttle and steering operations, and which can be readily applied to the prevailing types of outboard boat motors.

Additional objects of the invention will appear from the following description in which the preferred embodiments have been set forth in detail in conjunction with the accompanying drawing.

Referring to the drawing:

Figure 1 is a side elevational view, illustrating one embodiment of my invention, and diagrammatically showing connections between my apparatus and a conventional type of outboard boat motor.

Figure 2 is a plan view of the apparatus as shown in Figure 1.

Figure 3 is an enlarged view showing the throttle and steering means incorporated in the apparatus of Figure 1.

Figure 4 is a cross-sectional view taken along the line 4—4 of Figure 3.

Figure 5 is a cross-sectional view taken along the line 5—5 of Figure 3.

Figure 6 is a side elevational view of another embodiment of the invention, the view being similar to Figure 3.

Figure 7 is a cross-sectional view taken along the line 7—7 of Figure 6.

Figure 8 is a cross-sectional view taken along the line 8—8 of Figure 6.

Figure 9 is a side elevational view showing another embodiment of the invention.

Figures 10 and 11 are cross-sectional views illustrating the embodiment of Figure 9, and with the throttle member in different operating positions.

In Figure 1 of the drawing I have shown a conventional type of outboard motor A, which consists of a motor-propeller assembly 10, secured by bracket 11 to the transom 12 of a motor boat. The bracket has a pivotal connection (not shown) to the motor-propeller assembly which permits the entire motor-propeller assembly to be swung about a general vertical axis for steering the boat. A suitable steering or tiller arm 13 is attached to the motor mounting, and extends to a forward position within the boat for convenient engagement by the hand of an operator. A throttle lever 14 is also carried by the motor mounting, and may be adjusted to change the speed of operation. It is conventional practice to pivotally mount the throttle lever on a pivotal axis which is likewise upright and coincident with or relatively close to the axis about which the motor-propeller assembly swings in steering the boat. The forward end of the throttle lever 14 extends to a position generally above the tiller arm 13, whereby during steering movements the tiller arm and the throttle lever move substantially in unison.

The apparatus illustrated in Figures 1 and 2, for the remote steering and throttle control, includes the steering means B, and the throttle control means C.

The steering means B consists in this instance of a hand wheel 16, which is journaled to the mounting bracket 17, and which carries a winding drum 18.

The throttle control means C consists of a base reference member 19, together with the hand operated throttle member 21. The base member 19 can be in the form of a quadrant as illustrated, and the throttle member 21 can be in the form of a lever pivoted at 22 to the quadrant.

Suitable motion transmitting means serves to connect the throttle member 21 to the throttle lever 14 of the outboard motor. For this purpose it is convenient to use the extended pull lines 23a, 23b, which may be in the form of ropes, cables or chains, and which extend over suitable guide means for attachment with the throttle lever 14. Thus line 23a is shown extended over the guide pulley 24 for attachment at 26 to lever 14, and line 23b is shown extending over the guide pulleys 27, 28, 29, guide 31 and pulley 32 for similar attachment at 26 to lever 14.

The quadrant 19 is movably mounted upon the boat, and is interconnected with the steering means. Thus as shown in Figures 3 to 5 inclusive, a pair of parallel guide rods 36, 37 are provided, which are secured at their ends to mounting lugs 38, with these lugs in turn being formed upon the base plate 39. Sleeves 40 and 41 slidably embrace the rods 36, 37, and are rigidly attached to the quadrant 19. The base plate 39 is mounted upon the boat with the rods 36, 37 extending horizontally. Thus the quadrant 19 together with lever 21 may move freely for a substantial distance in a horizontal direction.

The motion transmitting means which serves to connect the steering hand wheel includes the lines 41a, 41b which are looped about the drum 18. Line 41b is shown extending over the guide pulleys 42, 43 and 44, through the guide 31, and thence over the pulley 46 for attachment at 47 to the steering arm 13. Line 41a extends from the drum 18 to a point of connection at 48 to one side of the quadrant 19. The other side of the quadrant is connected at 49 with the line 41c, and which extends over the guide pulley 51 for connection with the tiller arm at 47. The length of the lines 41a, 41b and 41c is such that when the tiller arm 13 is in straight ahead position, the quadrant 19 is midway between the ends of the guide rods 36, 37. When the hand wheel 16 is turned, steering movement is transmitted to the tiller arm 13, and for the extreme steering positions, the quadrant 19 assumes positions near the extremities of the guide rods 36, 37.

It will be noted that the point of connection 26 to the throttle lever 14 is at a point considerably below the plane of the lever, and in a region which is as close as convenient to the point of connection 47 to the steering arm 13. In most instances this will require the use of an extension device 52 which can be readily attached to the throttle lever, and which serves to extend the point of connection as indicated. The point of connection to the tiller arm can likewise be to a suitable clip or clamping device, which can be readily applied to the arm.

Operation of the apparatus described above is as follows: The throttle lever 14 can be swung throughout its range of movement by swinging the remote throttle lever 21. Suitable markings are applied to the quadrant 19 to clearly indicate the "start," "stop," "slow" and "fast" positions of the throttle. Initially the throttle is placed in start position, after which one starts the motor by the customary pull rope. After the motor has started one places the throttle 21 to the position desired, and the boat is steered by turning the handle 16. Although steering movements serve to swing the throttle lever 14 together with the entire motor-propeller assembly of the outboard motor, the remote throttle member 21 maintains a fixed position with respect to the quadrant 19. Therefore the position of the throttle 21 relative to the quadrant indicates at all times the position of the throttle on the motor.

In the embodiment of the invention illustrated in Figures 6 to 8 inclusive the steering means B is the same as the embodiment described above. The throttle means however consists of an annularly contoured casing 56 which is slidably tracked upon the horizontal rail 57. The sides of the casing have lugs or ears 58, 59 for attachment with the throttle control lines. Within the casing there is a drum 61 about which the throttle control lines are looped, and which is mounted upon the central shaft 62. The forward end of this shaft carries a hand operating lever 63, and a visual pointer 64. During steering operations the casing 56, together with the parts mounted upon the same, move back and forth as a unit along the guide rail 57. The pointer 64 remains relatively stationary with respect to the casing. When the lever 63 is turned motion is transmitted through the lines 23a, 23b to adjust the throttle lever 14 accordingly.

Figures 9 to 11 inclusive illustrate an embodiment in which the steering means and the remote throttle control means are incorporated together as a unitary structure. In this instance the casing 66 is provided with mounting flanges 67, whereby it can be directly and fixedly secured to a convenient part of the boat. Within the housing 66 there are two drums 68, 69, and about which the throttle control lines 23a, 23b, and the steering lines 41a, 41b respectively are wound. Drum 68 is mounted upon a central shaft 70, which has its rear end journaled in the casing as illustrated. A hand operated throttle member 71 is fixed to the forward end of the shaft 70. Drum 69 is carried by the hub 72, which forms a journal for the shaft 70, and which itself is journaled in the forward wall of the casing 66. The drums 68 together with shaft 70 are urged in a forward direction by the compression spring 73. Serrated or toothed edges 74, 75 are formed in the opposed faces of the drums 68, 69, and are arranged to lock the two drums together for unison rotation.

The position of the drum 68 relative to drum 69 can be controlled by manual force applied to the throttle member 71. Thus when force is applied to member 71 to urge the shaft 70 inwardly, the two drums are disengaged to permit independent rotation. However when member 71 is released, spring 73 returns the drum 68 to the locked position illustrated in Figure 10. The hand wheel 76 by means of which steering forces are applied, is directly mounted upon the hub 72 of the drum 69. In addition the spokes of the steering wheel are shown carrying a reference member in the form of a ring 77, which may carry such words as "start," "stop," "slow" and "fast" to visually indicate the relative position of the throttle.

Operation of the embodiment illustrated in Figures 9 to 11 inclusive is as follows: Turning of the hand wheel 76 serves to apply steering forces, and as this wheel is rotated the throttle member 71 rotates together with the ring 77. Drums 68, 69 remain locked together as shown in Figure 10, to rotate in unison. When one desires to change the throttle setting the member 71 is forced in a direction to temporarily separate the drums 68, 69, thus permitting independent rotation of member 71 relative to the steering wheel. When the throttle has been set to the position desired, it is released, thus permitting the spring 73 to return the drum 68 to locked position relative to drum 69.

It will be evident from the foregoing that I have provided a relatively simple apparatus which facilitates control of both steering and throttle from a remote point, and which can be installed with conventional types of outboard motors. Remote steering operations are synchronized with application of steering movements in such a manner that steering does not interfere with the throttle setting, and the operator is apprised at all times of the exact throttle setting being used.

I claim:

1. Steering and throttle control apparatus for outboard boat motors, wherein the outboard motor has a forwardly extending tiller member movable laterally for swinging the motor-propeller assembly about an upright axis, and also has a throttle lever pivotally carried by the motor assembly for lateral movement and extending forwardly of said named axis, said apparatus including a remote throttle member adapted to be moved manually, motion transmitting means connecting said remote member to said throttle lever for operation of the same, a second motion transmitting means connected to the tiller member for operation of the same, a reference member associated with said throttle member, and means forming a connection between said reference member and said second motion transmitting means to cause both the reference member and said remote throttle member to move in unison when steering motion is applied.

2. Steering and throttle control apparatus for outboard boat motors, wherein the outboard motor has a forwardly extending tiller member movable laterally for swinging the motor-propeller assembly about an upright axis, and also has a throttle lever pivotally carried by the motor assembly for lateral movement and extending forwardly of said first named axis, said apparatus including a remote throttle member adapted to be moved manually, motion transmitting means connecting said remote member to said throttle lever for operation of the same, a second motion transmitting means connected to the tiller member for operation of the same, a reference member forming a mounting for said throttle member, means forming a connection between said reference member and said second motion transmitting means to cause both the base reference member and said remote throttle member to move in unison when steering motion is applied, and means forming a mounting for both said reference member and said remote throttle member to enable unison movement of the same when steering forces are applied.

3. Steering and throttle control apparatus for outboard boat motors, wherein the outboard motor has a forwardly extending tiller member movable laterally for swinging the motor-propeller assembly about an upright axis and also has a throttle lever pivotally carried by the motor assembly for lateral movement and extending forwardly of said first named axis, said apparatus including a remote throttle member adapted to be moved manually, motion transmitting means connecting said remote throttle member to said throttle lever for operation of the same, a second motion transmitting means connected to the tiller member for operation of the same, a movable reference member forming a mounting for said remote throttle member, means forming a connection between said reference member and said second motion transmitting means to cause both the reference member and said remote throttle member to move in unison when steering motion is applied, and means serving to mount said reference member upon the boat to enable movements of the same in unison with said remote throttle member in response to application of steering forces.

4. Apparatus as in claim 3 in which the steering means includes a remote manually operated steering member operatively connected to said second motion transmitting means and having mounting means independent of said throttle member and said reference member.

5. Steering and throttle control apparatus for outboard motors, wherein the outboard motor has a forwardly extending tiller member movable laterally for swinging the motor-propeller assembly about an upright axis and also has a throttle lever pivotally carried by the motor assembly for lateral movement about and extending forwardly of said first named axis, said apparatus including a remote throttle member adapted to be moved manually, motion transmitting means connecting said remote throttle member to said throttle lever for operation of the same, a movable reference member associated with said throttle member to indicate the throttling position of the latter, a movable remote steering member, a second motion transmitting means connecting said remote steering member to said tiller arm, and releasable means for locking said steering member to said remote throttle member.

6. Steering and throttle control apparatus for outboard boat motors, wherein the outboard motor has a forwardly extending tiller arm for swinging the motor-propeller assembly about an upright axis and also has a throttle lever pivotally carried by the motor assembly for lateral movement and extending forwardly of said first named axis, said apparatus including motion transmitting lines connected to the tiller arm and to said throttle lever and extending forwardly of the motor-propeller assembly for remote operation, a pair of concentric drums about which said lines are looped for operation of the same, manual means for individually rotating each of said drums, and means for releasably locking said drums together for conjoint rotation.

7. Steering and throttle control apparatus for outboard boat motors wherein the outboard motor has a forwardly extending tiller member for swinging the motor-propeller assembly about an upright axis and also has a throttle lever pivotally carried by the motor assembly for lateral movement and extending forwardly of said first named axis, said apparatus including a pair of motion transmitting lines connected to the tiller arm and to the throttle lever and extending forwardly of the boat for remote operation, a pair of concentric drums about which said lines are wound, a hand wheel attached to one of said drums, a manually operable throttle member attached to the other one of said drums, means for releasably locking said drums together for unison rotation, said means being operable by axial movement of one of said drums relative to the other, spring means for urging said drums toward locked position of the same, said drums being movable to disengage position by force applied to said throttle member, and a reference member rotatable in unison with the drum to which the steering wheel is attached, said reference member serving to indicate the angular position of the throttle member relative to the hand wheel.

LESTER C. BLACK.

No references cited.